(12) United States Patent
Karlapalem et al.

(10) Patent No.: US 11,580,140 B2
(45) Date of Patent: Feb. 14, 2023

(54) SYSTEM OF VISUALIZING AND QUERYING DATA USING DATA-PEARLS

(71) Applicant: INTERNATIONAL INSTITUTE OF INFORMATION TECHNOLOGY, HYDERABAD, Hyderabad (IN)

(72) Inventors: Kamalakar Karlapalem, Hyderabad (IN); Nahil Jain, Hyderabad (IN); Ayush Jain, Hyderabad (IN); Nikhil Gogate, Hyderabad (IN)

(73) Assignee: INTERNATIONAL INSTITUTE OF INFORMATION TECHNOLOGY, HYDERABAD, Hyderabad (IN)

(*) Notice: Subject to any disclaimer, the term of this patent is extended or adjusted under 35 U.S.C. 154(b) by 63 days.

(21) Appl. No.: 17/156,405

(22) Filed: Jan. 22, 2021

(65) Prior Publication Data
US 2021/0224299 A1    Jul. 22, 2021

(30) Foreign Application Priority Data
Jan. 22, 2020  (IN) .............................. 202041002814

(51) Int. Cl.
*G06F 7/00* (2006.01)
*G06F 16/28* (2019.01)
(Continued)

(52) U.S. Cl.
CPC ........ *G06F 16/287* (2019.01); *G06F 16/2425* (2019.01); *G06F 16/2462* (2019.01); *G06F 16/24534* (2019.01); *G06F 16/283* (2019.01)

(58) Field of Classification Search
CPC .............. G06F 16/287; G06F 16/2425; G06F 16/24534; G06F 16/283; G06F 16/2462
See application file for complete search history.

(56) References Cited

U.S. PATENT DOCUMENTS

| 6,092,072 | A | * | 7/2000 | Guha | .................... G06F 16/287 707/700 |
| 6,100,901 | A | * | 8/2000 | Mohda | ..................... G06T 7/11 345/440 |

(Continued)

FOREIGN PATENT DOCUMENTS

WO    WO2018083963 A1 *  5/2018

*Primary Examiner* — Daniel A Kuddus (57) ABSTRACT

A system and method for visualizing and querying high dimensional data to a user. The system includes a user device, a data-pearls visualization and querying server. The server obtains the high dimensional data from the user device associated with user. The server generates data clusters and sub-divides the data clusters into non-overlapping subsets of data-pearls using a clustering technique. The server selects a shape for each data-pearl by comparing a distance between centroid of a data-pearl and a farthest point from a determined centroid using $L_p$ norm distance measures. The server configures each data-pearl in a three-dimensional plot. The server enables the user to visualize the data-pearls on a screen of the user device. The server queries data based on a query using data dimension technique. The server dimensions data related to the query through determined classifiers based on filtered data after pruning unrelated data to the query.

13 Claims, 10 Drawing Sheets

(51) Int. Cl.
*G06F 16/2453* (2019.01)
*G06F 16/242* (2019.01)
*G06F 16/2458* (2019.01)

(56) References Cited

U.S. PATENT DOCUMENTS

| | | | | |
|---|---|---|---|---|
| 6,115,708 | A * | 9/2000 | Fayyad | G06F 16/35 |
| | | | | 707/999.005 |
| 6,117,508 | A * | 9/2000 | Parsonage | B32B 27/288 |
| | | | | 428/411.1 |
| 9,198,621 | B2 * | 12/2015 | Fernstrom | A61B 5/1123 |
| 9,720,998 | B2 * | 8/2017 | Wang | G06F 16/285 |
| 10,013,477 | B2 * | 7/2018 | Ye | G06F 16/285 |
| 10,162,878 | B2 * | 12/2018 | Nuchia | G06F 16/285 |
| 10,824,607 | B2 * | 11/2020 | Xia | G06F 16/9024 |
| 2012/0038341 | A1 * | 2/2012 | Michishita | H02M 3/158 |
| | | | | 323/284 |
| 2012/0246164 | A1 * | 9/2012 | Xavier | G06K 9/6215 |
| | | | | 707/737 |
| 2017/0075981 | A1 * | 3/2017 | Carlsson | H04L 41/0826 |
| 2018/0025035 | A1 * | 1/2018 | Xia | G06F 16/2282 |
| | | | | 707/600 |
| 2018/0025093 | A1 * | 1/2018 | Xia | G06F 16/9024 |
| | | | | 707/602 |

\* cited by examiner

SYSTEM OF VISUALIZING AND QUERYING DATA USING DATA-PEARLS

CROSS-REFERENCE TO RELATED APPLICATIONS

This patent application claims priority to Indian provisional patent application no: 202041002814 filed on Jan. 22, 2020, the complete disclosures of which, in their entirety, are hereby incorporated by reference.

Technical Field

The embodiments herein generally relate to data visualization method, and more particularly, relates to a system and method for visualizing and querying on high dimensional data using data clusters known as data-pearls.

Description of the Related Art

Extracting meaningful information from large quantities of data is a difficult task. Representation of data visually and effectively is not an easy task. The visual representation of data is called Data Visualization. Aim of the data visualization is to enable users to detect expected as well as unexpected the data and gain meaningful insights into the data. One or more techniques for domain-dependent as well as domain-independent have been developed for multi-dimensional data visualization. Different data types may require different visualization techniques. Multivariate datasets occur very often in domains from science to finance. Data points in such datasets either already include classes or they are clustered or classified to extract meaningful information. In a multi-dimensional real data cluster, data points include shape, e.g. structure of the cluster and size, e.g. spread of the cluster. Visualizing the shape and structure of the data points help in understanding the clusters. Understanding the clusters helps in performing further data analysis and comparing one cluster with another cluster.

Existing technologies such as parallel coordinates, scatter plot matrices, and Radial Coordinate Visualization (RadViz) are used to visually explain results of clustering algorithms and the data clusters. In parallel coordinates, the visualization becomes too clustered as a number of dimensions and the data points increases. In scatter, plot matrix, the visualization of N×N scatter plots are not human-friendly as they are not scalable in terms of plotting the points on the computer. The RadViz technique is difficult to interpret as for a user and a task is still in terms of difficulty for cognitive abilities. The RadViz technique is not effective when a dataset is not sparse.

Existing technologies for querying data such as Structured Query Language (SQL) have hard limitations among all attributes. To query in the SQL, the users need to learn the language.

Therefore, there arises a need to address the aforementioned technical drawbacks in existing technologies in visualizing high-dimensional data.

SUMMARY

In view of foregoing an embodiment herein provides a processor-implemented method for visualizing high dimensional data using at least one data-pearl to a user. The method includes extracting, using a clustering technique, at least one data cluster from the high dimensional data and sub-dividing the at least one data cluster into the at least one data-pearl from the high dimensional data. The method includes selecting a $L_p$ norm shape for each data-pearl by comparing a distance between a centroid of the at least one data-pearl and a farthest point from the centroid of the at least one data-pearl using $L_p$ norm distance measures. The method includes configuring each data-pearl in the $L_p$ norm shape in a three-dimensional plot using a radius of the $L_p$ norm shape, a sector angle in the three-dimensional plot, and elevation angle. The method includes enabling the user to visualize at least one data-pearl of the high dimensional data, using a graphics module in a user device associated with the user.

In some embodiments, the method further performs querying the high-dimensional data based on a query provided by the user using at least one dimension, by (i) determining the at least one data-pearl and placing separately using domain values of the at least one dimension, (ii) selecting, using a concept search, the at least one data-pearl based on the query provided by the user, (iii) incrementing the at least one data-pearl based on a volume of the at least one dataset, the at least one dataset comprises the at least one data-pearl and the at least one data-pearl comprises at least one attribute, (iv) filtering the high-dimensional data based on the at least one data-pearl, (v) selecting data related to the query and performing steps from (i) to (iv) repetitively, and (vi) dimensioning data related to the query through determined classifiers based on filtered data after pruning unrelated data to the query.

In some embodiments, the method further includes an origin of the three-dimensional plot is a centroid of the at least one data cluster and a range of axes of the three-dimensional plot are defined by a distance between a center of each data-pearl, the centroid of the at least one data cluster, and a radius of each data-pearl.

In some embodiments, the method further includes representing a high-dimensional space occupied by the high-dimensional data as sectors in a plane of the three-dimensional plot.

In some embodiments, the method further includes configuring the at least one data-pearl lying in a high-dimensional space in a corresponding sector of the sectors in the plane of the three-dimensional plot occupied by the high-dimensional data during construction of the $L_p$ norm shape.

In some embodiments, the elevation angle is an angle between the centroid of the at least one data-pearl and a unit vector in dimension with maximum standard deviation.

In some embodiments, the method further includes constructing the $L_p$ norm shape by providing an envelope for the at least one data-pearl using the $L_p$ norm distance measures, defining the envelope using the $L_p$ norm distance measures such that $L_p(x,y)=r$, x, and y are a set of points on the envelope for a given distance value r, the envelope obtains the $L_p$ norm shape based on the value of p.

In some embodiments, the method further performs identifying the $L_p$ norm shape from a given set of $L_p$ norm shapes as determined by the closed sets formed by points having at most distance using the $L_p$ norm distance measures.

In some embodiments, the method further includes each data-pearl is not partitioned further and is not overlapped with one another.

In one aspect, there is provided one or more non-transitory computer-readable storage medium storing the one or more sequence of instructions, which when executed to the one or more processors, causes to perform a method for visualizing a high dimensional data using at least one data-pearl to a user. The method includes extracting, using a clustering technique, at least one data cluster from the high dimensional data and sub-dividing the at least one data cluster into the at least one data-pearl from the high dimensional data. The method includes selecting a $L_p$ norm shape for each data-pearl by comparing a distance between a centroid of the at least one data-pearl and a farthest point from the centroid of the at least one data-pearl using $L_p$ norm distance measures. The method includes configuring each data-pearl in the $L_p$ norm shape in a three-dimensional plot using a radius of the $L_p$ norm shape, a sector angle in the three-dimensional plot, and elevation angle. The method includes enabling the user to visualize at least one data-pearl of the high dimensional data, using a graphics module of a user device associated with the user.

In another aspect, there is provided a system for visualizing a high dimensional data using at least one data-pearl to a user. The system includes a device processor and a non-transitory computer-readable storage medium storing one or more sequences of instructions, which when executed by the device processor causes the steps of: (i) extracting, using a clustering technique, at least one data cluster from the high dimensional data and sub-dividing the at least one data cluster into the at least one data-pearl from the high dimensional data; (ii) selecting a $L_p$ norm shape for each data-pearl by comparing a distance between a centroid of the at least one data-pearl and a farthest point from the centroid of the at least one data-pearl using $L_p$ norm distance measures; (iii) configuring each data-pearl in the $L_p$ norm shape in a three-dimensional plot using a radius of the $L_p$ norm shape, a sector angle in the three-dimensional plot, and elevation angle; and (iv) enabling the user to visualize at least one data-pearl one of the high dimensional data, using a graphics module of a user device associated with the user.

In some embodiments, the method further performs querying the high-dimensional data based on a query provided by the user using at least one dimension, by (i) determining the at least one data-pearl and placing separately using domain values of the at least one dimension, (ii) selecting, using a concept search, the at least one data-pearl based on the query provided by the user, (iii) incrementing the at least one data-pearl based on a volume of the at least one dataset, the at least one dataset comprises the at least one data-pearl and the at least one data-pearl comprises at least one attribute, (iv) filtering the high-dimensional data based on the at least one data-pearl, (v) selecting data related to the query and performing steps from (i) to (iv) repetitively, and (vi) dimensioning data related to the query through determined classifiers based on filtered data after pruning unrelated data to the query.

In some embodiments, the system further includes representing a high-dimensional space occupied by the high-dimensional data as sectors in a plane of the three-dimensional plot.

In some embodiments, the system performs configuring the at least one data-pearl lying in a high-dimensional space in a corresponding sector of the sectors in the plane of the three-dimensional plot occupied by the high-dimensional data during construction of the $L_p$ norm shape.

In some embodiments, the elevation angle is an angle between the centroid of the at least one data-pearl and a unit vector in dimension with maximum standard deviation.

In some embodiments, the system further includes constructing the $L_p$ norm shape by providing an envelope for the at least one data-pearl using the $L_p$ norm distance measures, defining the envelope using the $L_p$ norm distance measures such that $L_p(x,y)=r$, x, and y are a set of points on the envelope for a given distance value r, the envelope obtains the $L_p$ norm shape based on the value of p.

In some embodiments, the system further includes identifying the $L_p$ norm shape from a given set of $L_p$ norm shapes as determined by the closed sets formed by points having at most distance using the $L_p$ norm distance measures.

In some embodiments, the system further includes each data-pearl is not partitioned further and is not overlapped with one another.

BRIEF DESCRIPTION OF THE DRAWINGS

The embodiments herein will be better understood from the following detailed description with reference to the drawings, in which.

DETAILED DESCRIPTION OF THE DRAWINGS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for visual querying on high dimensional data using data clusters that are data-pearls. Referring now to the drawings, and more particularly to FIGS. 1 through 8, where, preferred embodiments are shown.

Figure 1:
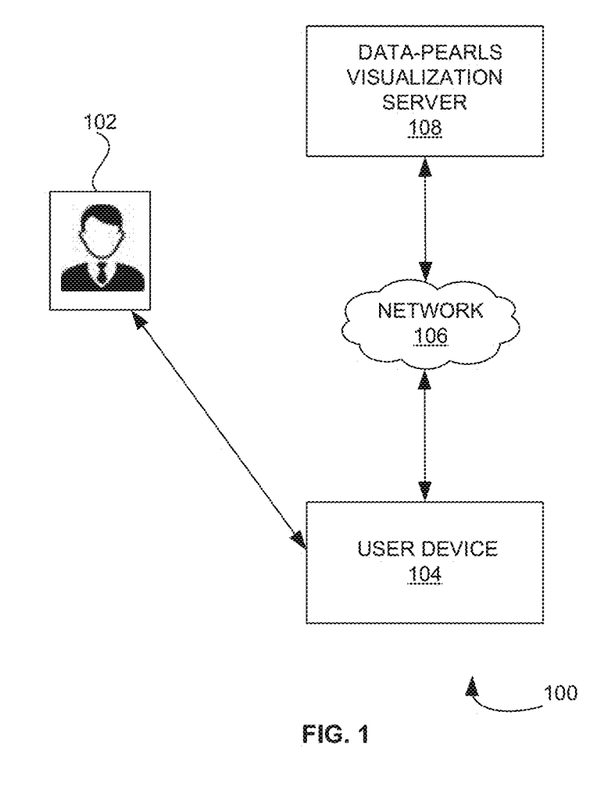
FIG. 1 is a block diagram that illustrates a system of visualizing high-dimensional data using data-pearls according to some embodiments herein.

FIG. 1 is a block diagram 100 that illustrates a system of visualizing high-dimensional data using data-pearls according to some embodiments herein. The block diagram 100 includes a user device 104 associated with a user 102, and a data-pearls visualization and querying server 108. The data-pearls visualization and querying server 108 provides an intuitive and interactive interface for visual data exploration to the user device 104 associated with the user 102. The user device 104 and the data-pearls visualization and querying server 108 communicate through a network 106. In some embodiments, the network 106 is a wired network. In some embodiments, the network 106 is a wireless network. In some embodiments, the network 106 is a combination of a wired network and a wireless network. In some embodiments, the network 106 is the Internet and the like. In some embodiments, the user device 104, without limitation, may be selected from a mobile phone, a Personal Digital Assistant (PDA), a tablet, a desktop computer, or a laptop. The data-pearls visualization and querying server 108 includes and a device processor and a non-transitory computer-readable storage medium storing one or more sequences of instructions, which when executed by the device processor causes visualization of the high dimensional data using at least one data-pearl by the user 102. In some embodiments, the system 100 may include an application that may be installed in android based devices, windows-based devices, or any such mobile operating systems devices for visualizing the high-dimensional data using data-pearls.

The data-pearls visualization and querying server 108 obtains high dimensional data from the user device 104 associated with the user 102. The high dimensional data may be given to the data-pearls visualization and querying server 108 through a user interface associated with the user device 104. In some embodiments, high dimensional data include data in one or more dimensions.

The high dimensional data may include at least one dataset. The at least one dataset may include at least one data cluster. The data-pearls visualization and querying server 108 extracts at least one data cluster from the high dimensional data using a clustering technique. The data-pearls visualization and querying server 108 sub-divides the at least one data cluster into at least one data-pearl from the high dimensional data using the clustering technique. The at least one data-pearl is a subset of the at least one data cluster. Each data-pearl is not partitioned further and is not overlapped with one another. In some embodiments, the clustering technique may be K-means clustering technique. The data-pearls visualization and querying server 108 selects a $L_p$ norm shape for each data-pearl. The $L_p$ norm shape is selected by comparing a distance between a centroid of the at least one data-pearl and a farthest point from the centroid of the data-pearl using $L_p$ norm distance measures. The farthest point is computed from the centroid of the data-pearl using the $L_p$ norm distance measures. In some embodiments, the $L_p$ norm shapes may be a cube, sphere, etc. In some embodiments, each $L_p$ norm distance measure may be defined as a positive square root of sum of all squares of the distance in each dimension related to the high-dimensional data. In some embodiments, the $L_p$ norm shape is selected using any other distance measures other than $L_p$ norm distance measures.

The data-pearls visualization and querying server 108 configures each data-pearl in the $L_p$ norm shape in a three-dimensional plot using a radius of the $L_p$ norm shape, a sector angle, and elevation angle. In some embodiments, the elevation angle is an angle between the centroid of the at least one data-pearl and a unit vector in dimension with maximum standard deviation. The data-pearls visualization and querying server 108 defines an origin of the three-dimensional plot a centroid of the at least one data cluster. The data-pearls visualization and querying server 108 defines a range of axes of the three-dimensional plot using a distance between a center of each data-pearl, the centroid of the at least one data cluster, and a radius of each data-pearl. The data-pearls visualization and querying server 108 represents a high-dimensional space occupied by the high-dimensional data as sectors in a plane of the three-dimensional plot. The data-pearls visualization and querying server 108 plots the at least one data-pearl lying in the high dimensional space in a corresponding sector of the three-dimensional plot to construct the $L_p$ norm shape.

The data-pearls visualization and querying server 108 constructs the $L_p$ norm shape by providing an envelope for the at least one data-pearl using the $L_p$ norm distance measures. The data-pearls visualization and querying server 108 defines the envelope using the $L_p$ norm distance measures such that $L_p(x,y)=r$, x, and y are a set of points on the envelope for a given distance value r, wherein the envelope obtains the $L_p$ norm shape based on the value of p. The data-pearls visualization and querying server 108 identifies the $L_p$ norm shape from a given set of $L_p$ norm shapes as determined by the closed sets formed by points having at most distance using $L_p$ norm distance measures.

For example, four-dimensional (4D) space of four-dimensional data is divided into 16 parts by w, x, y and z axes. In some embodiments, orthogonal axes divisions of the high dimensional space are represented as sectors in XY plane of the three-dimensional plot. Correspondingly, the XY plane of the three-dimensional plot is also divided into sectors. In some embodiments, the data-pearls lying in various axes are plotted in the corresponding sector in the three-dimensional plot while constructing an overall shape of the clusters. The three-dimensional plot may provide a projection of the data-pearl position on the XY plane. The projection of the data-pearl is used for accessing Z-axis. The projection of the data-pearl position is obtained using the three-dimensional plot. In some embodiments, the three-dimensional plot is elevated by the elevation angle.

The data-pearls visualization and querying server 108 enables the user 102 to visualize at least one data-pearl one of the high dimensional data, using a graphics module on a screen of the user device 104.

The data-pearls visualization and querying server 108 enable the user 102 to search the high-dimensional data based on a query provided by the user 102 using at least one dimension, by (i) determining the at least one data-pearl and placing it in a separated manner using domain values of the at least one dimension, (ii) selecting, using a concept search, the at least one data-pearl based on the query provided by the user 102, (iii) incrementing the at least one data-pearl based on a volume of the at least one dataset, (iv) filtering the high-dimensional data based on the at least one data-pearl, the at least one dataset comprises the at least one data-pearl and the at least one data-pearl comprises at least one attribute, (v) selecting data related to the query and performing steps from (i) to (iv) iteratively and recursively, and (vi) dimensioning data related to the query through determined classifiers based on filtered data after pruning unrelated data to the query.

In some embodiments, the at least one attribute of the user 102 may include acceleration, strength, finishing, heading, diving etc. In some embodiments, for example, the query in the concept search may be, "finding all the football players who are good strikers and have moderate heading accuracy". The data-pearls visualization and querying server 108 selects the at least one attribute based on the query. In some embodiments, using the query stated above, the data-pearls visualization and querying server 108 determines a group of datapoints of all the football players who are "good" at striking, and a group of datapoints of all the football players who are "moderate". A data-dimension is selected as "finishing" data attribute on one axis and as "heading accuracy" data attribute on another axis. The data-pearls visualization and querying server 108 filters the data-pearls using a data dimension technique. The data-pearls visualization and querying server 108 dimensions the data-pearls based on filtered data. The data-pearls visualization and querying server 108 determines number of classifiers on Z-axis using the three-dimensional plot. In some embodiments, the Z-axis is a group of datapoints of all the football players who are "moderate" as finishing. The data-pearls visualization and querying server 108 removes irrelevant data-pearls by considering the Z coordinate values. In some embodiments, the steps are recorded as a video in the user device 104.

Figure 2:
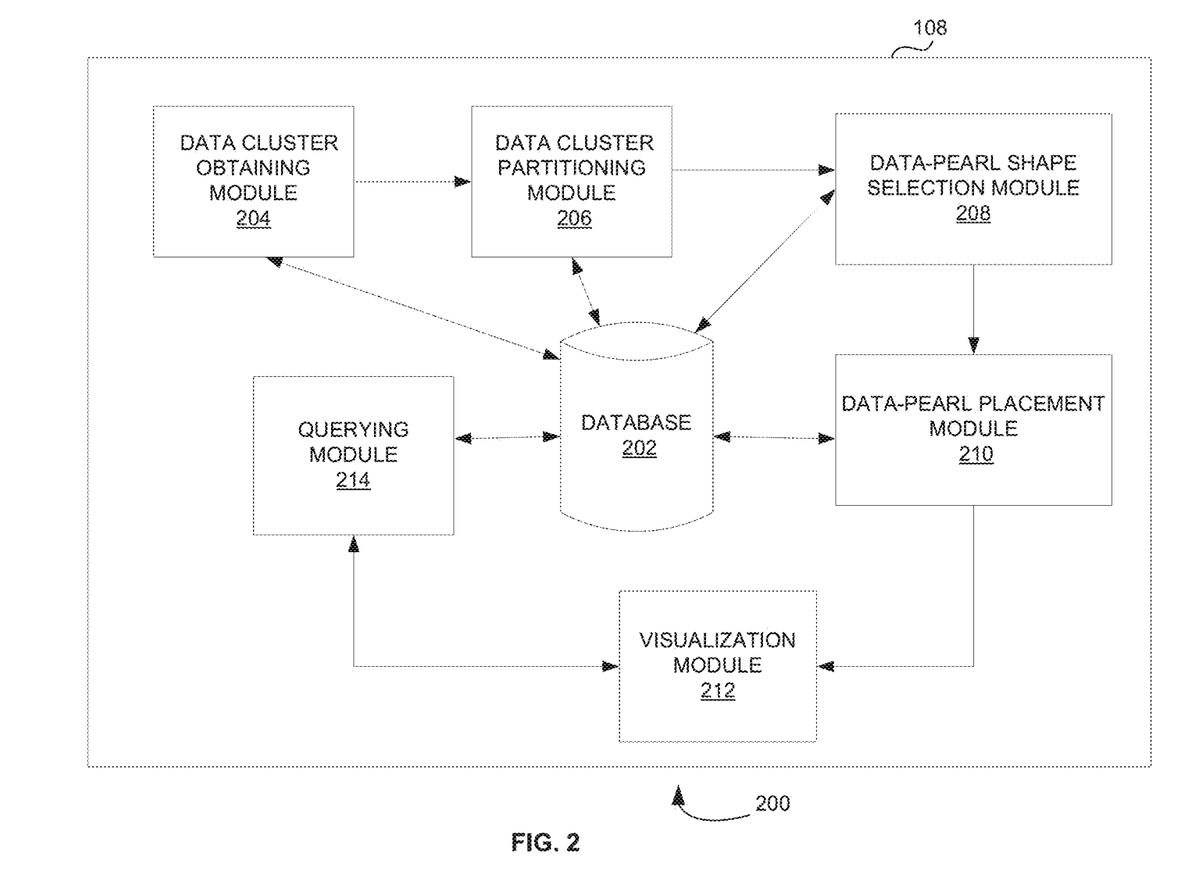
FIG. 2 is a block diagram of a data-pearls visualization and querying server according to some embodiments herein.

FIG. 2 is a block diagram 200 of the data-pearls visualization and querying server 108 according to some embodiments herein. The data-pearls visualization and querying server 108 includes a database 202, a data cluster obtaining module 204, a data cluster partitioning module 206, a data-pearl shape selection module 208, a data-pearl placement module 210, a visualization module 212 and a querying module 214. The database 202 stores data clusters and visualized data-pearls. The data cluster obtaining module 204 receives datasets from the user device 104 associated with the user 102. In some embodiments, the datasets include clusters of the high dimensional data. The data cluster partitioning module 206 extracts at least one data cluster from the high dimensional data using a clustering technique. The data cluster partitioning module 206 sub-divides the at least one data cluster into at least one data-pearl from the high dimensional data using the clustering technique. The at least one data-pearl is a subset of the at least one data cluster. Each data-pearl is not partitioned further and is not overlapped with one another. In some embodiments, the clustering technique may be K-means clustering technique. The data-pearl shape selection module 208 selects a $L_p$ norm shape for each data-pearl. The $L_p$ norm shape is selected by comparing a distance between a centroid of the at least one data-pearl and a farthest point from the centroid of the data-pearl using $L_p$ norm distance measures. The farthest point is computed from the centroid of the data-pearl using the $L_p$ norm distance measures. In some embodiments, the $L_p$ norm shapes may be cube, sphere, etc. In some embodiments, the $L_p$ norm shape is constructed by providing an envelope for the at least one data-pearl using the $L_p$ norm distance measures. In some embodiments, the envelope is defined by using the $L_p$ norm distance measures such that $L_p$ (x,y)=r, x, and y are a set of points on the envelope for a given distance value r, the envelope obtains the $L_p$ norm shape based on the value of p. The data-pearl shape selection module 208 selects the $L_p$ norm shape from a given set of $L_p$ norm shapes as determined by the closed sets formed by points having at most distance using $L_p$ norm distance measures.

The data-pearl placement module 210 configures each data-pearl in the $L_p$ norm shape in a three-dimensional plot using a radius of the $L_p$ norm shape, a sector angle, and elevation angle. In some embodiments, the elevation angle is an angle between the centroid of the at least one data-pearl and a unit vector in dimension with maximum standard deviation. The data-pearl placement module 210 defines an origin of the three-dimensional plot is a centroid of the at least one data cluster and a range of axes of the three-dimensional plot using a distance between a center of each data-pearl, the centroid of the at least one data cluster, and a radius of each data-pearl. In some embodiments, a high-dimensional space is represented as space occupied by the high-dimensional data as sectors in a plane of the three-dimensional plot. The data-pearl placement module 210 plots the at least one data-pearl lying in the high-dimensional space in a corresponding sector of the three-dimensional plot to construct the $L_p$ norm shape.

The visualization module 212 enables the user 102 to visualize at least one data-pearl one of the high dimensional data, using a graphics module on a screen of the user device 104. The querying module 214 enable the user 102 to search the high-dimensional data based on a query provided by the user 102 using at least one dimension, by (i) determining the at least one data-pearl and placing it in a separated manner using domain values of the at least one dimension, (ii) selecting, using a concept search, the at least one data-pearl based on the query provided by the user 102, (iii) incrementing the at least one data-pearl based on a volume of the at least one dataset, the at least one dataset comprises the at least one data-pearl, wherein the at least one data-pearl comprises at least one attribute, (iv) filtering the high-dimensional data based on the at least one data-pearl, (v) selecting data related to the query and performing steps from (i) to (iv) repetitively, and (vi) dimensioning data related to the query through determined classifiers based on filtered data after pruning unrelated data to the query.

Figure 3A:
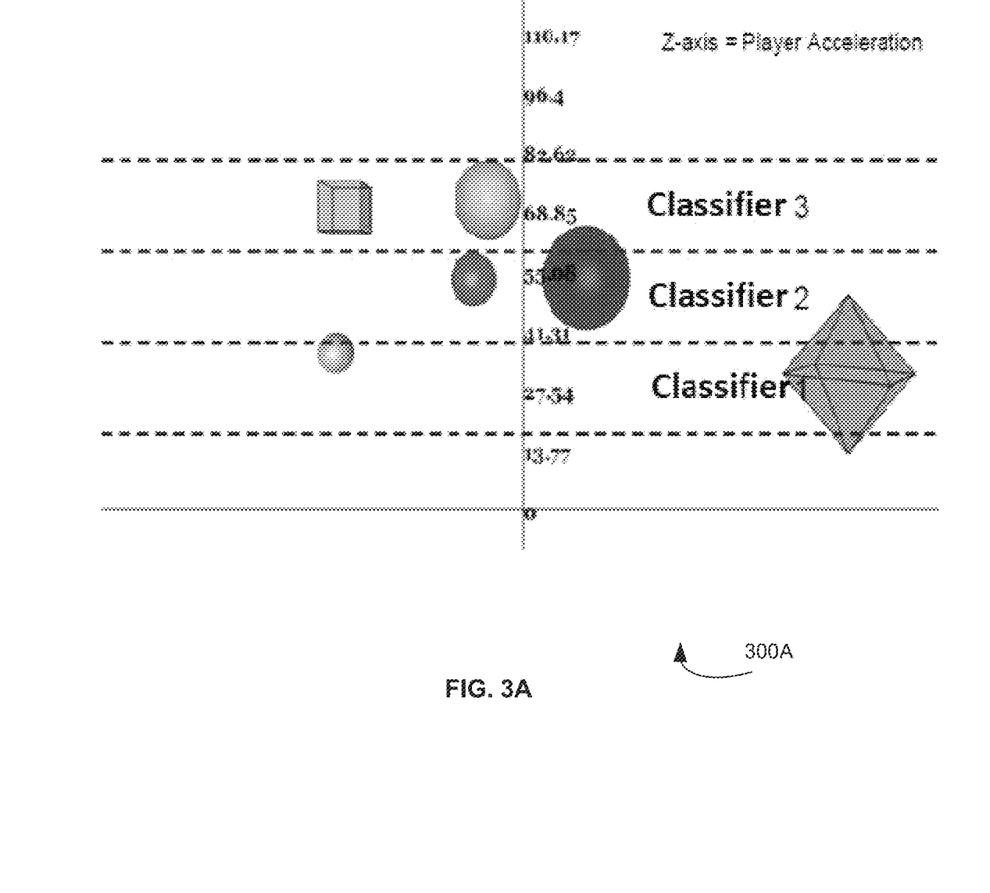
FIGS. 3A-3C are exemplary representations that illustrate data visualization and results of concept search on footballer's dataset according to some embodiments herein.
Figure 3B:
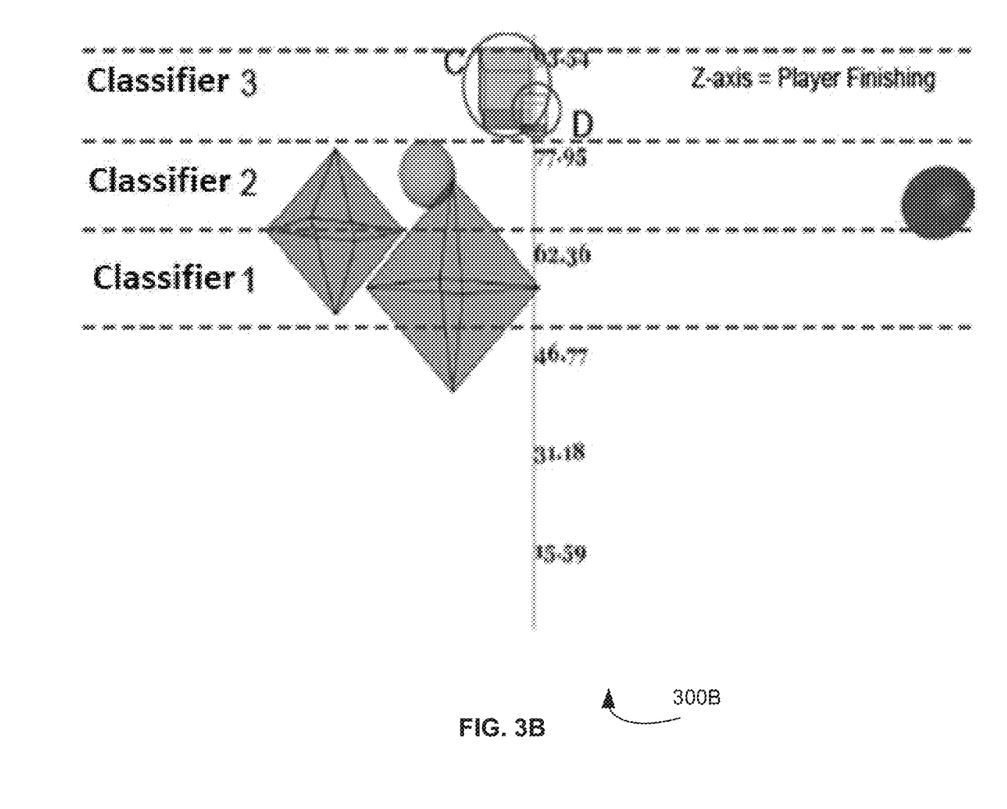
Figure 3C:
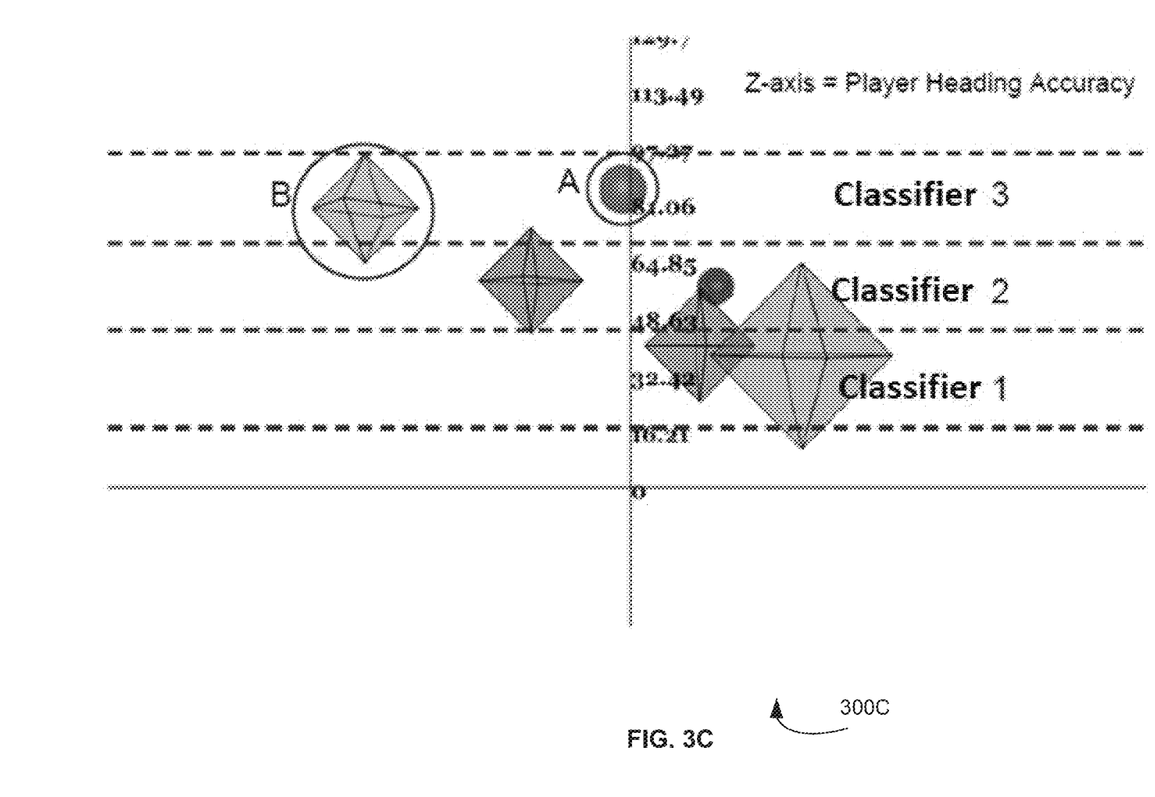

FIGS. 3A-3C are exemplary representations that illustrate data visualization and results of concept search on football players dataset according to some embodiments herein. In FIG. 3A, a graphical representation 300A that depicts data dimension feature on the football players dataset with acceleration chosen as data dimension. In some embodiments, the football players dataset includes data one or more footballers, e.g. 1000 to 18,000 football players. In some embodiments, the football players dataset includes attributes of each football player. The attributes of each football player may include a name, an acceleration, an aggression, a balance, a ball control, a composure, a crossing, etc. The data dimension feature is fixed with a number of classifiers such as a Classifier1, a Classifier2, and a Classifier3. In some embodiments, the Classifier1 represents as highly accelerated football players. In some embodiments, the Classifier2 represents as medium accelerated football players. In some embodiments, the Classifier3 represents as low accelerated football players. Each classifier is divided into two data-pearls as shown in the FIG. 3A.

In FIG. 3B, a graphical representation 300B that represents intermediate results after performing attribute filtering by selecting relevant attributes such as acceleration, finishing, heading accuracy, penalties, sprint speed, and volley is provided. The football striker is identified at C and D in the FIG. 3B after attribute filtering. After attribute filtering, the data-pearls other than C and D are removed. By looking at Z co-ordinate values irrelevant data-pearls are removed. By iteratively re-clustering with different data dimension across previously selected data may yield relevant data-pearls. FIG. 3C, a graphical representation 300C that represents final results A and B, which are the relevant data-pearls that are obtained after iteratively re-clustering with different data dimension across previously selected data.

Figure 4:
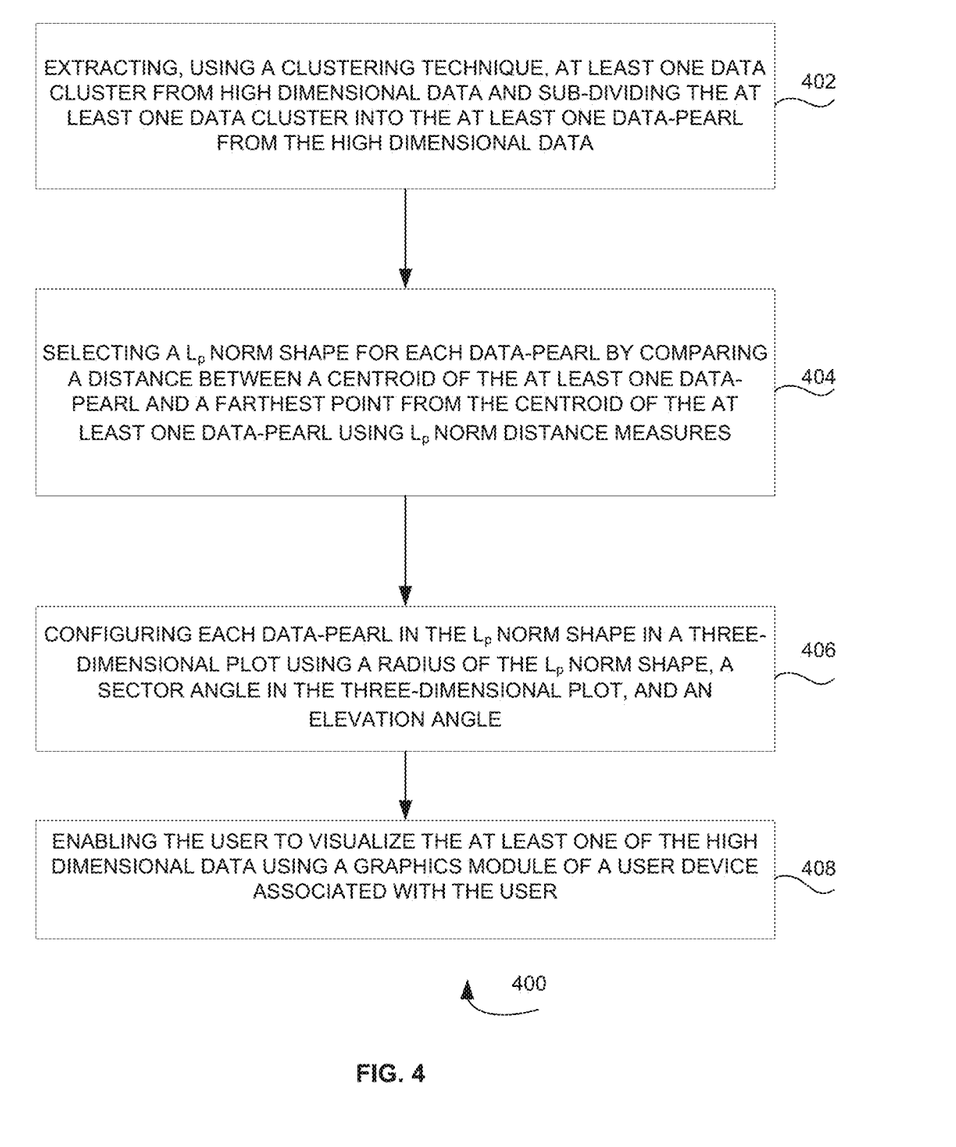
FIG. 4 is a flow diagram that illustrates a method of visualizing high dimensional data using at least one data-pearl by a user according to some embodiments herein.

FIG. 4 is a flow diagram that illustrates a method 400 for visualizing a high dimensional data using at least one data-pearl by a user 102 according to some embodiments herein. At a step 402, the method 400 includes extracting, using a clustering technique, at least one data cluster and sub-dividing the at least one data cluster into the at least one data-pearl from the high dimensional data. In some embodiments, the high dimensional data is data in one or more dimensions. At step 404, the method 400 includes selecting a $L_p$ norm shape for each data-pearl by comparing a distance between a centroid of the at least one data-pearl and a farthest point from the centroid of the at least one data-pearl using $L_p$ norm distance measures. At step 406, the method 400 includes configuring each data-pearl in the $L_p$ norm shape in a three-dimensional plot using a radius of the $L_p$ norm shape, a sector angle in the three-dimensional plot, and elevation angle. At step 408, the method 400 includes enabling the user 102 to visualize at least one data-pearl one of the high dimensional data, using a graphics module of a user device associated with the user.

Figure 5:
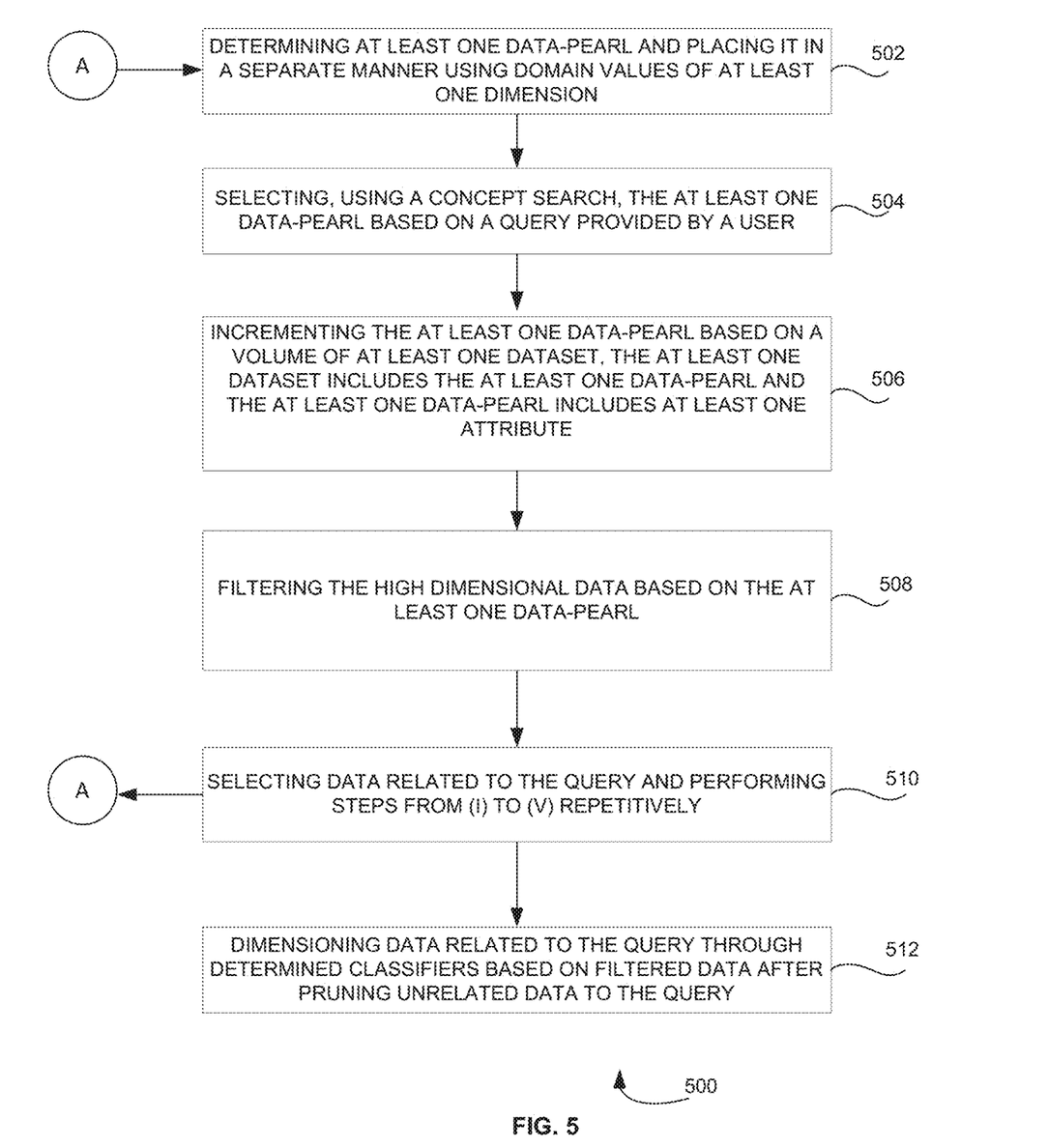
FIG. 5 is a flow diagram that illustrates a method of querying the high-dimensional data based on a query using the at least one data-pearl according to some embodiments herein.

FIG. 5 is a flow diagram that illustrates a method 500 of querying high-dimensional data based on a query using the at least one of data-pearl according to some embodiments herein. At step 502, the method 500 includes determining the at least one data-pearl and placing it in a separated manner using domain values of at least one dimension. At step 504, the method 500 includes selecting, using a concept search, the at least one data-pearl based on the query provided by a user 102. In some embodiments, using the concept of search, the data-pearls visualization and querying server 108 determines a group of datapoints. At step 506, the method 500 includes incrementing the at least one data-pearl based on a volume of the at least one dataset, the at least one dataset includes the at least one data-pearl and the at least one data-pearl includes at least one attribute. At step 508, the method 500 includes filtering the high-dimensional data based on the at least one data-pearl. In some embodiments, the number of classifiers on Z-axis are determined using three-dimensional plot. At step 510, the method 500 includes selecting data related to the query and performing steps from (i) to (iv) repetitively. At step 512, the method 500 includes dimensioning data related to the query through determined classifiers based on filtered data after pruning unrelated data to the query.

Figure 6:
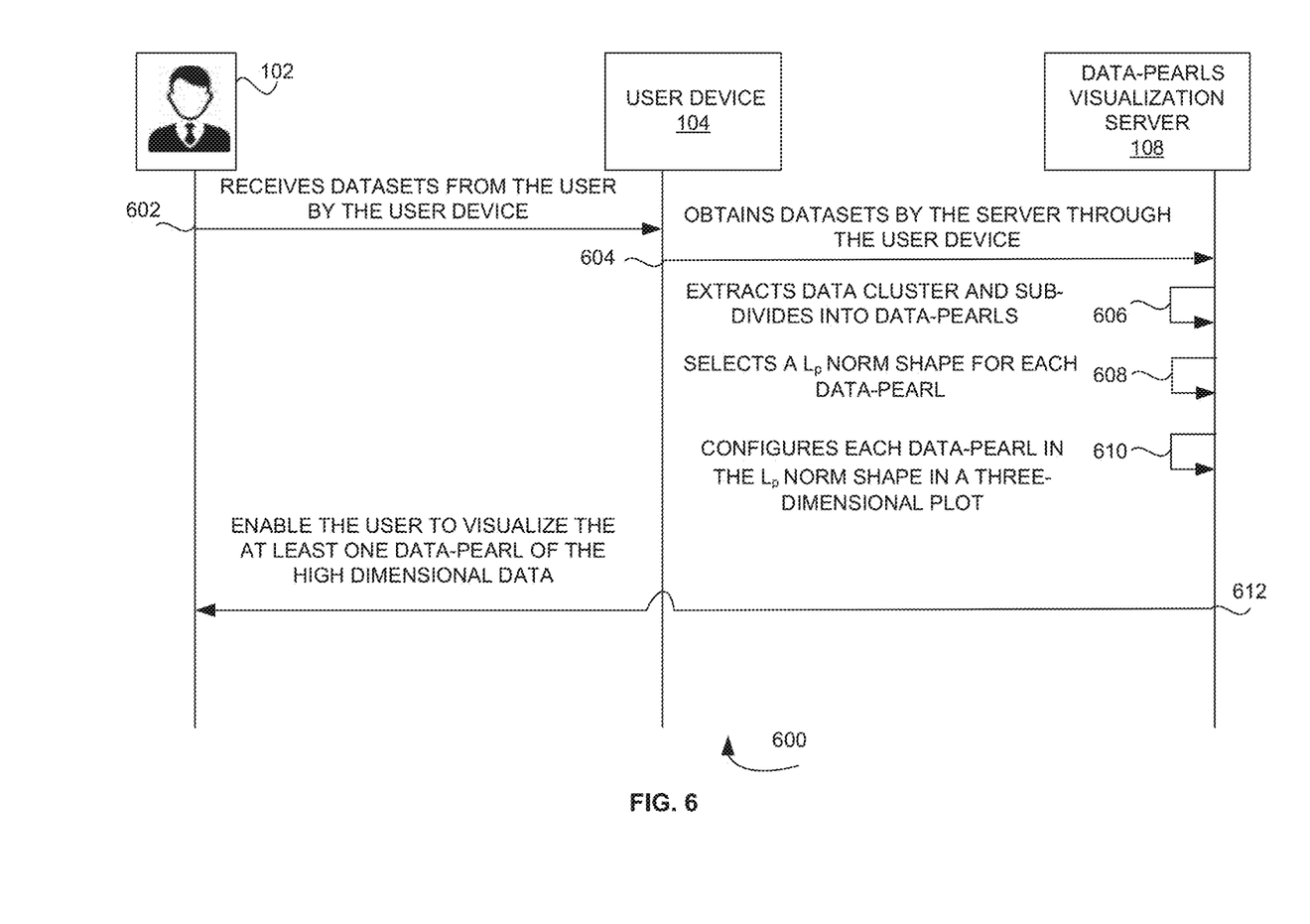
FIG. 6 is an interaction diagram that illustrates a method of visualizing high dimensional data using data-pearls, according to some embodiments herein.

FIG. 6 is an interaction diagram that illustrates a method 600 of visualizing high dimensional data using data-pearls, according to some embodiments herein. At step 602, the method 600 includes receiving datasets from the user 102 associated with a user device 104. At step 604, the method 600 includes obtaining the datasets by the data-pearls visualization and querying server 108 through the user device 104. In some embodiments, the datasets include high dimensional data, that is the data in one or more dimensions. At step 606, the method 600 includes extracting at least one data cluster from the high dimensional data and sub-dividing the at least one data cluster into the at least one data-pearl from the high dimensional data. In some embodiments, the at least one data-pearl is a subset of the at least one data cluster. At step 608, the method 600 includes selecting a $L_p$ norm shape for each data-pearl. In some embodiments, the $L_p$ norm shape is selected by comparing a distance between a centroid of the at least one data-pearl and a farthest point from the centroid of the at least one data-pearl using $L_p$ norm distance measures. At step 610, the method 600 includes configuring each data-pearl in the $L_p$ norm shape in a three-dimensional plot. In some embodiments, each data-pearl is configured using a radius of the $L_p$ norm shape, a sector angle in the three-dimensional plot, and elevation angle. At step 612, the method includes enabling the user 102 to visualize at least one data-pearl of the high dimensional data, using a graphics module.

Figure 7:
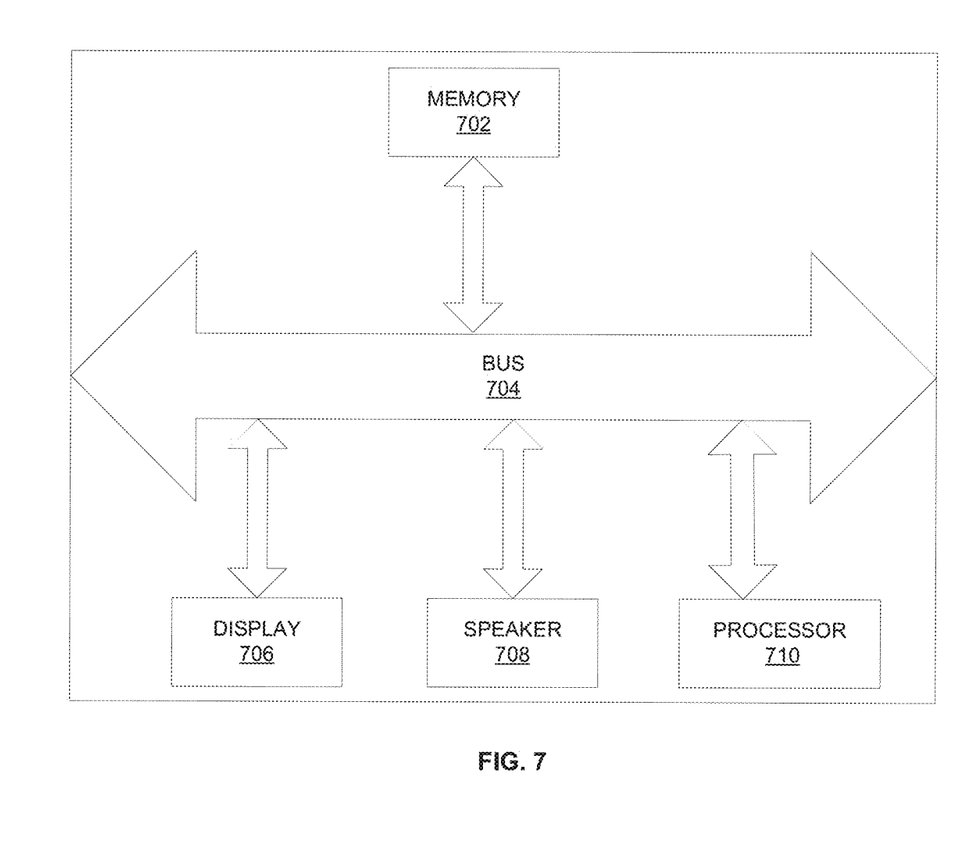
FIG. 7 illustrates an exploded view of a computing device according to an embodiment herein.

IG. 7 illustrates an exploded view of a data-pearls visualization and querying server 108 of FIG. 1 according to the embodiments herein. The data-pearls visualization and querying server 108 having a memory 702 having a set of computer instructions, a bus 704, a display 706, a speaker 708, and a processor 710 capable of processing a set of instructions to perform any one or more of the methodologies herein, according to an embodiment herein. The processor 710 may also enable digital content to be consumed in the form of a video for output via one or more displays 706 or audio for output via speaker and/or earphones 708. The processor 710 may also carry out the methods described herein and in accordance with the embodiments herein.

The embodiments herein can take the form of, an entirely hardware embodiment, an entire software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet cards are just a few of the currently available types of network adapters.

Figure 8:
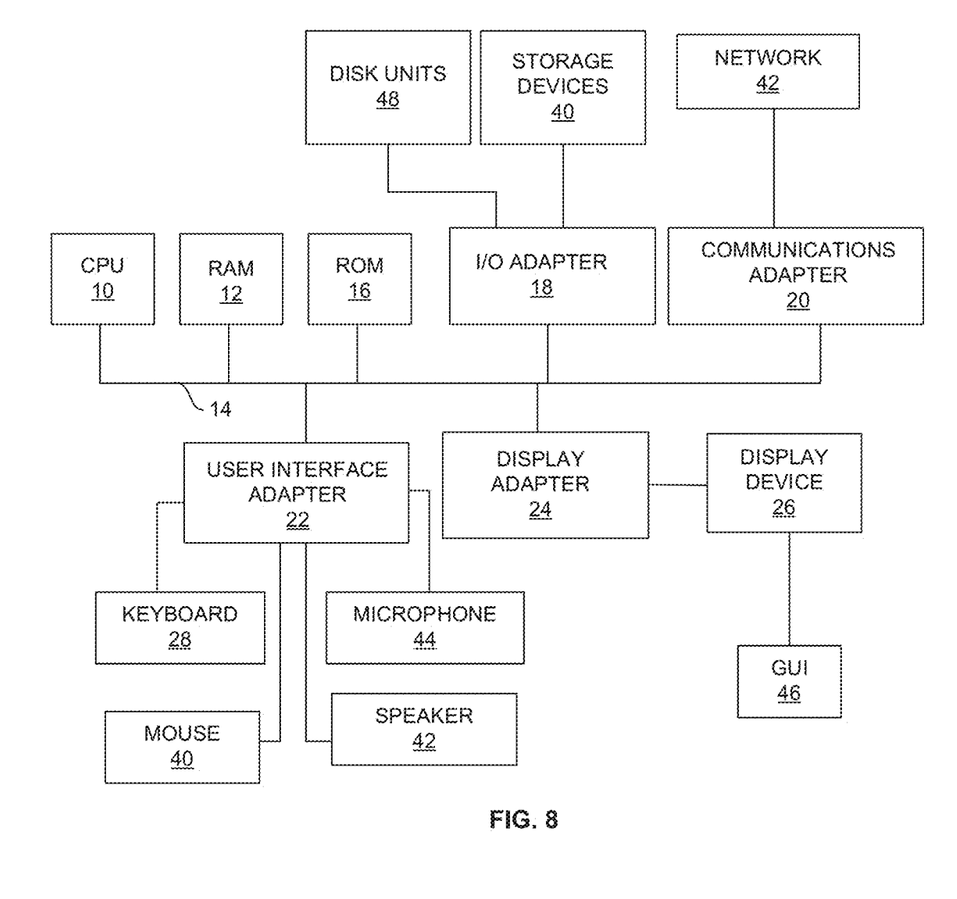
FIG. 8 is a schematic diagram of a computer architecture in accordance with the embodiments herein.

A representative hardware environment for practicing the embodiments herein is depicted in FIG. 8, with reference to FIGS. 1 through 7. This schematic drawing illustrates a hardware configuration of a data-pearls visualization and querying server 108/computer system/computing device in accordance with the embodiments herein. The system includes at least one processing device CPU 10 that may be interconnected via system bus 14 to various devices such as a random access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The system provides a humanly understandable visualization of high dimensional data. The system helps to understand high dimensional data visually. The system provides visual querying on high dimensional data. For querying, no need of learning any new languages. The system is very easy to use. The system provides the ability to determine data of interest through iterative selection and exploration. The system employs a simple technique that has wider applicability for data visualization. The system analyses clustering techniques based on the selection of a number of clusters and it becomes the visualization is clearer.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A computer-implemented method for generating visual representations of high dimensional data using a plurality of data-pearls to a user, said method performed by one or more hardware processors comprising:
   implementing a clustering technique that is configured to extract at least one data cluster from the high dimensional data and sub-dividing the at least one data cluster that is extracted into the plurality of data-pearls such that the plurality of data-pearls are not partitioned further and are not overlapped with one another;
   implementing $L_p$ norm distance measures that is configured to select a $L_p$ norm shape for each data-pearl of the at least one data cluster by comparing an average distance (Ap) between a centroid of the plurality of data-pearls and all points in the plurality of data-pearls to obtain a minimum average distance, wherein the minimum average distance is fixed as p;
   constructing the $L_p$ norm shape by providing an envelope for the plurality of data-pearls using the $L_p$ norm distance measures by defining the envelope using the $L_p$ norm distance measures such that $L_p(x,y)=r$, x, and y are a set of points on the envelope based on a given distance value r, wherein the given distance value r is equal to the minimum average distance;
   representing a high-dimensional space occupied by the high-dimensional data as sectors in a plane of a three-dimensional plot by defining an origin of the three-dimensional plot as centroid of the at least one data cluster and a range of axes of the three-dimensional plot based on a distance between a center of each data-pearl, the centroid of the at least one data cluster and a radius of each data-pearl;
   plotting each data-pearl in the $L_p$ norm shape in a corresponding sector of the plane of the tree-dimensional plot using a radius of the $L_p$ norm shape, a sector angle in the three-dimensional plot, and an elevation angle; and
   generating visual representations of the plurality of data-pearls of the high dimensional data in plotted $L_p$ norm shapes in the sectors of the plane of the three-dimensional plot using a graphics module of a user device associated with the user.

2. The method of claim 1, further comprising querying the high-dimensional data based on a query provided by the user using at least one dimension, by
   (i) determining the plurality of data-pearls and placing the plurality of data-pearls separately using domain values of the at least one dimension,
   (ii) implementing a concept search that is configured to select the plurality of data-pearls based on the query provided by the user,
   (iii) incrementing the plurality of data-pearls based on a volume of at least one dataset, wherein the at least one dataset comprises the plurality of data-pearls, wherein the plurality of data-pearls comprises at least one attribute,
   (iv) filtering the high-dimensional data based on the plurality of data-pearls,
   (v) selecting data related to the query and performing steps from (i) to (iv) repetitively, and
   (vi) dimensioning the data related to the query through determined classifiers based on filtered data after pruning unrelated data to the query.

3. The method of claim 1, wherein the farthest point is computed from the centroid of corresponding data-pearl based on Lp norm distance measures.

4. The method of claim 1, wherein the elevation angle is an angle between the centroid of the plurality of data-pearls and a unit vector in dimension with maximum standard deviation.

5. The method of claim 1, further comprising identifying the $L_p$ norm shape from a given set of $L_p$ norm shapes as determined by the closed sets formed by points having at a most distance using the $L_p$ norm distance measures.

6. The method of claim 1, wherein each Lp norm distance measure defined as a positive square root of sum of all squares of the distance in each dimension related to the high-dimensional data.

7. One or more non-transitory computer-readable storage medium storing the one or more sequence of instructions, which when executed by the one or more processors, causes to perform a method of generating visual representations of high dimensional data using a plurality of data-pearls to a user, wherein the method comprises:
   implementing a clustering technique that is configured to extract at least one data cluster from the high dimensional data and sub-dividing the at least one data cluster that is extracted into the plurality of data-pearls such that the plurality of data-pearls is not partitioned further and is not overlapped with one another;
   implementing $L_p$ norm distance measures that is configured to select a $L_p$ norm shape for each data-pearl of the at least one data cluster by comparing an average distance (Ap) between a centroid of the plurality of data-pearls all points in the plurality of data-pearls to obtain a minimum average distance, wherein the minimum average distance is fixed as p;
   constructing the $L_p$ norm shape by providing an envelope for the plurality of data-pearls using the $L_p$ norm distance measures by defining the envelope using the $L_p$ norm distance measures such that $L_p(x,y)=r$, x, and y are a set of points on the envelope based on a given distance value r, wherein the given distance value r is equal to the minimum average distance;

representing a high-dimensional space occupied by the high-dimensional data as sectors in a plane of a three-dimensional plot by defining an origin of the three-dimensional plot as centroid of the at least one data cluster and a range of axes of the three-dimensional plot based on a distance between a center of each data-pearl, the centroid of the at least one data cluster and a radius of each data-pearl;

plotting each data-pearl in the $L_p$ norm shape in a corresponding sector of the plane of the three-dimensional plot using a radius of the $L_p$ norm shape, a sector angle in the three-dimensional plot, and an elevation angle; and generating visual representations of the plurality of data-pearls of the high dimensional data in plotted $L_p$ norm shapes in the sectors of the plane of the three-dimensional plot using a graphics module of a user device associated with the user.

8. A system for generating visual representations of high dimensional data using a plurality of data-pearls to a user comprising:

a device processor; and a non-transitory computer-readable storage medium storing one or more sequences of instructions, which when executed by the device processor, causes:

implement a clustering technique that is configured to extract at least one data cluster from the high dimensional data and sub-dividing the at least one data cluster that is extracted into the plurality of data-pearls such that the plurality of data-pearls is not partitioned further and is not overlapped with one another;

implement $L_p$ norm distance measures that is configured to select a $L_p$ norm shape for each data-pearl of the at least one data cluster by comparing an average distance (Ap) between a centroid of the plurality of data-pearls and all points in the plurality of data-pearls to obtain a minimum average distance, wherein the minimum average distance is fixed as p;

construct the $L_p$ norm shape by providing an envelope for the plurality of data-pearls using the $L_p$ norm distance measures by defining the envelope using the L norm distance measures such that $L_p(x,y)=r$, x, and y are a set of points on the envelope based on a given distance value r, wherein the given distance value r is equal to the minimum average distance;

represent a high-dimensional space occupied by the high-dimensional data as sectors in a plane of a three-dimensional plot by defining an origin of the three-dimensional plot as centroid of the at least one data cluster and a range of axes of the three-dimensional plot based on a distance between a center of each data-pearl, the centroid of the at least one data cluster and a radius of each data-pearl;

plot each data-pearl in the $L_p$ norm shape in a corresponding sector of h plane of the three-dimensional plot using a radius of the $L_p$ norm shape, a sector angle in the three-dimensional plot, and an elevation angle; and generate visual representations of the plurality of data-pearls of the high dimensional data in plotted $L_p$ norm shapes in the sectors of the plane of the three-dimensional plot using a graphics module of a user device associated with the user.

9. The system of claim 8, wherein the system further performs querying the high-dimensional data based on a query using the at least one of data-pearl, by, (i) determining the plurality of data-pearls and placing the plurality of data-pearls separately using domain values of the at least one dimension, (ii) implementing a concept search that is configured to select the plurality of data-pearls based on the query provided by the user, (iii) incrementing the plurality of data-pearls based on a volume of at least one dataset, wherein the at least one dataset comprises the plurality of data-pearls, wherein the plurality of data-pearls comprises at least one attribute, (iv) filtering the high-dimensional data based on the plurality of data-pearls, wherein the at least one dataset comprises the plurality of data-pearls and the plurality of data-pearls comprises at least one attribute, (v) selecting data related to the query and performing steps from (i) to (iv) repetitively, and (vi) dimensioning the data related to the query through determined classifiers based on filtered data after pruning unrelated data to the query.

10. The system of claim 8, wherein the farthest point is computed from the centroid of corresponding data-pearl based on Lp norm distance measures.

11. The system of claim 8, wherein the elevation angle is an angle between the centroid of the plurality of data-pearls and a unit vector in dimension with maximum standard deviation.

12. The system of claim 8, further comprising identifying the $L_p$ norm shape from a given set of $L_p$ norm shapes as determined by the closed sets formed by points having at a most distance using the $L_p$ norm distance measures.

13. The system of claim 8, wherein each Lp norm distance measure is defined as a positive square root of sum of all squares of the distance in each dimension related to the high-dimensional data.

* * * * *